United States Patent
Asai et al.

(10) Patent No.: US 9,755,253 B2
(45) Date of Patent: Sep. 5, 2017

(54) FUEL CELL SYSTEM

(71) Applicant: NISSAN MOTOR CO., LTD., Kanagawa (JP)

(72) Inventors: Yoshitomo Asai, Yokohama (JP); Hiroshi Takeda, Yokohama (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 83 days.

(21) Appl. No.: 14/381,779

(22) PCT Filed: Feb. 27, 2013

(86) PCT No.: PCT/JP2013/055233
§ 371 (c)(1),
(2) Date: Aug. 28, 2014

(87) PCT Pub. No.: WO2013/129521
PCT Pub. Date: Sep. 6, 2013

(65) Prior Publication Data
US 2015/0030953 A1    Jan. 29, 2015

(30) Foreign Application Priority Data

Feb. 29, 2012 (JP) .............. 2012-043873
Mar. 1, 2012 (JP) .............. 2012-045739
Jan. 24, 2013 (JP) .............. 2013-011415

(51) Int. Cl.
*H01M 8/04* (2016.01)
*H01M 8/04111* (2016.01)
(Continued)

(52) U.S. Cl.
CPC ...... *H01M 8/04111* (2013.01); *H01M 8/0438* (2013.01); *H01M 8/04089* (2013.01);
(Continued)

(58) Field of Classification Search
None
See application file for complete search history.

(56) References Cited

U.S. PATENT DOCUMENTS

2004/0115495 A1*  6/2004  Asai ............... H01M 8/04089
                                                    429/414
2013/0040219 A1*  2/2013  Naganuma ....... H01M 8/04014
                                                    429/429

FOREIGN PATENT DOCUMENTS

JP    2007-257956 A    10/2007
JP    2008-016399 A    1/2008
(Continued)

*Primary Examiner* — Patrick Ryan
*Assistant Examiner* — Haixia Zhang
(74) *Attorney, Agent, or Firm* — Young Basil Hanlon & MacFarlane, P.C.

(57) ABSTRACT

A fuel cell system includes a fuel cell stack, a compressor, a cathode flow passage, a bypass flow passage branching from the cathode flow passage, thereby bypassing the stack, a bypass valve adjusting a bypass flow rate, a stack flow rate sensor detecting a flow rate to the stack, and a compressor flow rate sensor detecting a flow rate into the compressor. A flow rate for the stack depending on a state of a fuel cell and a flow rate the compressor controls depending on a requirement different from that of the stack are calculated. A control unit controls, when the flow rate required from the compressor is more than that required by the stack, the compressor based on the flow rate required from the compressor and a detected compressor flow rate, and controls the bypass valve based on the flow rate required by the stack and a detected stack flow rate.

5 Claims, 8 Drawing Sheets (51) Int. Cl.
*H01M 8/04089* (2016.01)
*H01M 8/0438* (2016.01)
*H01M 8/04746* (2016.01)
*H01M 8/2465* (2016.01)

(52) U.S. Cl.
CPC ... *H01M 8/04395* (2013.01); *H01M 8/04425* (2013.01); *H01M 8/04746* (2013.01); *H01M 8/04753* (2013.01); *H01M 8/04776* (2013.01); *H01M 8/2465* (2013.01); *H01M 2250/20* (2013.01)

(56) References Cited

FOREIGN PATENT DOCUMENTS

| | | | |
|---|---|---|---|
| JP | 2009-076243 A | 4/2009 | |
| JP | 2009-123550 A | 6/2009 | |
| JP | WO 2011135610 A1 * | 11/2011 | ........ H01M 8/04014 |

* cited by examiner

FUEL CELL SYSTEM

CROSS-REFERENCE TO RELATED APPLICATIONS

This application claims priority from Japanese Patent Application No. 2012-43873, filed Feb. 29, 2012, Japanese Patent Application No. 2012-45739, filed Mar. 1, 2012, and Japanese Patent Application No. 2013-11415, filed Jan. 24, 2013, each of which is incorporated herein in its entirety by reference.

TECHNICAL FIELD

This invention relates to a fuel cell system.

BACKGROUND

In a fuel cell system disclosed in JP 2009-123550 A, a cathode compressor is operated so that a flow rate of the air supplied to a fuel cell stack reaches a target flow rate required for electric power generation. Then, when the cathode compressor supplies the air at an air flow rate (air flow rate for surge avoidance) more than that required for the electric power generation, the compressor supplies the flow rate more than the air flow rate required for the electric power generation, and uses a bypass valve to supply a bypass passage with a flow rate component unnecessary for the stack.

BRIEF SUMMARY

In JP 2009-123550 A, the compressor supplies the flow rate for the surge avoidance, and control for the bypass valve involves detecting the air flow rate supplied to the fuel cell stack with an air flow rate sensor provided on a stack inlet side downstream of the bypass valve, and then feeding back an opening degree of a control valve so that the detected flow rate reaches a target flow rate for the stack. In the control of JP 2009-123550 A, the control for the compressor is open control, and it is thus concerned that the compressor flow rate is more than the flow rate to be supplied.

Even in this case, the flow rate supplied to the stack can be controlled to reach the target flow rate by increasing the opening degree of the bypass valve. However, when the supply flow rate of the compressor is originally more than the flow rate for the surge avoidance, the open control cannot decrease the flow rate, and it is thus concerned that electric power consumed by the compressor increases.

This invention has been made in view of these problems identified in the related art. An object of this invention is to provide a fuel cell system capable of preventing an unnecessary increase in power consumption of a compressor.

According to one embodiment of this invention, there is provided a fuel cell system, including a fuel cell stack a cathode compressor configured to supply a cathode gas, a cathode flow passage connected to the fuel cell stack, for the cathode gas to flow, a bypass flow passage branching from the cathode flow passage upstream of the fuel cell stack, thereby bypassing the fuel cell stack, a bypass valve provided on the bypass flow passage and configured to adjust a cathode flow rate flowing through the bypass flow passage, a stack flow rate sensor configured to detect a cathode flow rate supplied to the fuel cell stack, and a compressor flow rate sensor configured to detect a cathode flow rate taken into the cathode compressor. The fuel cell system further includes a required stack flow rate calculation unit configured to calculate a flow rate necessary for the stack depending on a state of a fuel cell, a required compressor flow rate calculation unit configured to calculate a flow rate which the compressor controls to flow depending on a requirement different from the requirement by the stack, and a control unit configured to control, when the flow rate required from the compressor is more than the flow rate required by the stack, the cathode compressor based on the flow rate required from the compressor and a compressor flow rate detected by the compressor flow rate sensor, and control the bypass valve based on the flow rate required by the stack and a stack flow rate detected by the stack flow rate sensor.

A detailed description is given below of embodiments of this invention and advantages of this invention referring to the accompanying drawings.

DETAILED DESCRIPTION (First Embodiment)

Figure 1:
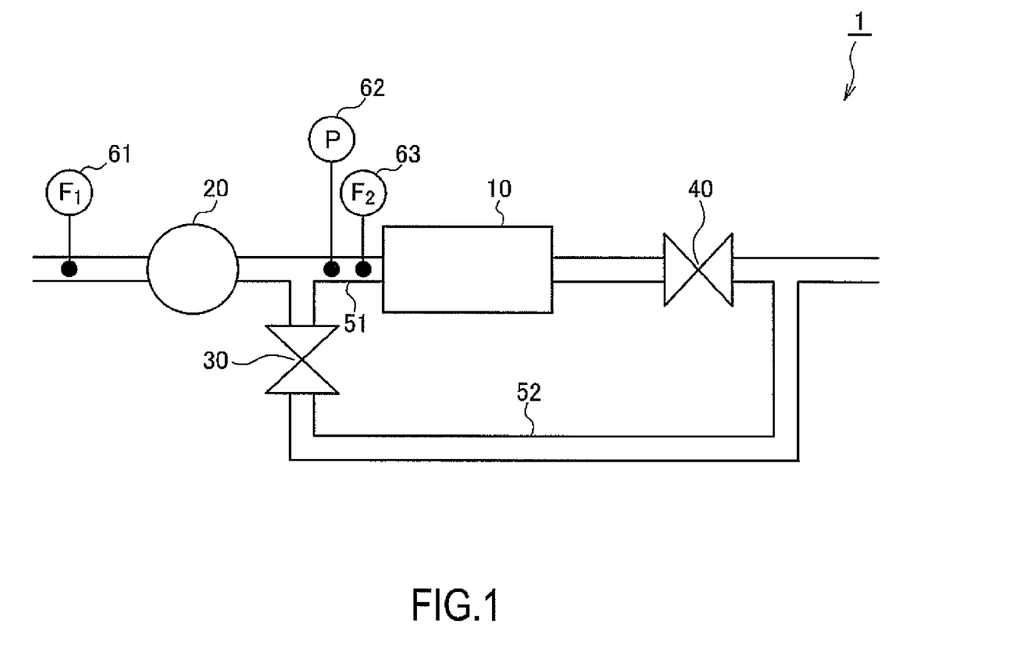
FIG. 1 is a diagram illustrating a principal part (cathode gas system) of a fuel cell system according to this invention.

FIG. 1 is a diagram illustrating a principal part (cathode gas system) of a fuel cell system according to this invention.

A fuel cell system 1 includes a fuel cell stack 10, a cathode compressor 20, a bypass valve 30, and an air pressure regulating valve 40.

The fuel cell stack 10 is supplied with an anode gas and a cathode gas, thereby generating electric power.

The cathode compressor 20 pressure-feeds the air. The cathode compressor 20 is provided on a cathode flow passage 51. The cathode flow passage 51 is connected to the fuel cell stack 10. The air pressure-fed by the cathode compressor 20 flows through the cathode flow passage 51.

The bypass valve 30 is provided in the course of a bypass flow passage 52. The bypass flow passage 52 branches from the cathode flow passage 51 upstream of the fuel cell stack 10, and merges with the cathode flow passage 51 downstream of the fuel cell stack 10. A part (surplus air unnecessary for the fuel cell stack 10) of the air pressure-fed by the cathode compressor 20 is branched and flows through the bypass flow passage 52. The bypass valve 30 adjusts the cathode flow rate flowing through the bypass flow passage 52.

The air pressure regulating valve 40 is provided on the cathode flow passage 51 downstream of the fuel cell stack 10, and upstream of the merging portion of the bypass flow passage 52. As an opening degree of the air pressure regulating valve 40 decreases, the pressure in the cathode flow passage 51 increases. As the opening degree of the air pressure regulating valve 40 increases, the pressure in the cathode flow passage 51 decreases.

A compressor flow rate sensor 61 is provided on the cathode flow passage 51 upstream of the cathode compressor 20. The compressor flow rate sensor 61 detects a cathode flow rate (compressor intake flow rate F1) taken into the cathode compressor 20.

A pressure sensor 62 and a stack flow rate sensor 63 are provided on the cathode flow passage 51 downstream of the branching portion of the bypass flow passage 52 and upstream of the fuel cell stack 10. The pressure sensor 62 detects a cathode pressure (stack inlet pressure P) at an inlet of the fuel cell stack 10. The stack flow rate sensor 63 detects a cathode flow rate (stack supply flow rate F2) supplied to the fuel cell stack 10.

The anode gas (hydrogen), which is not shown, is also supplied to the fuel cell stack 10. The fuel cell stack 10 generates a power generation reaction by using the cathode gas (oxygen) and the anode gas (hydrogen), thereby generating the electric power. A waste gas (hydrogen off-gas) that has not been consumed by the power generation reaction is mixed into the cathode flow passage 51 downstream of the air pressure regulating valve 40, is diluted by the cathode gas, and is discharged into the atmosphere.

Figure 2:
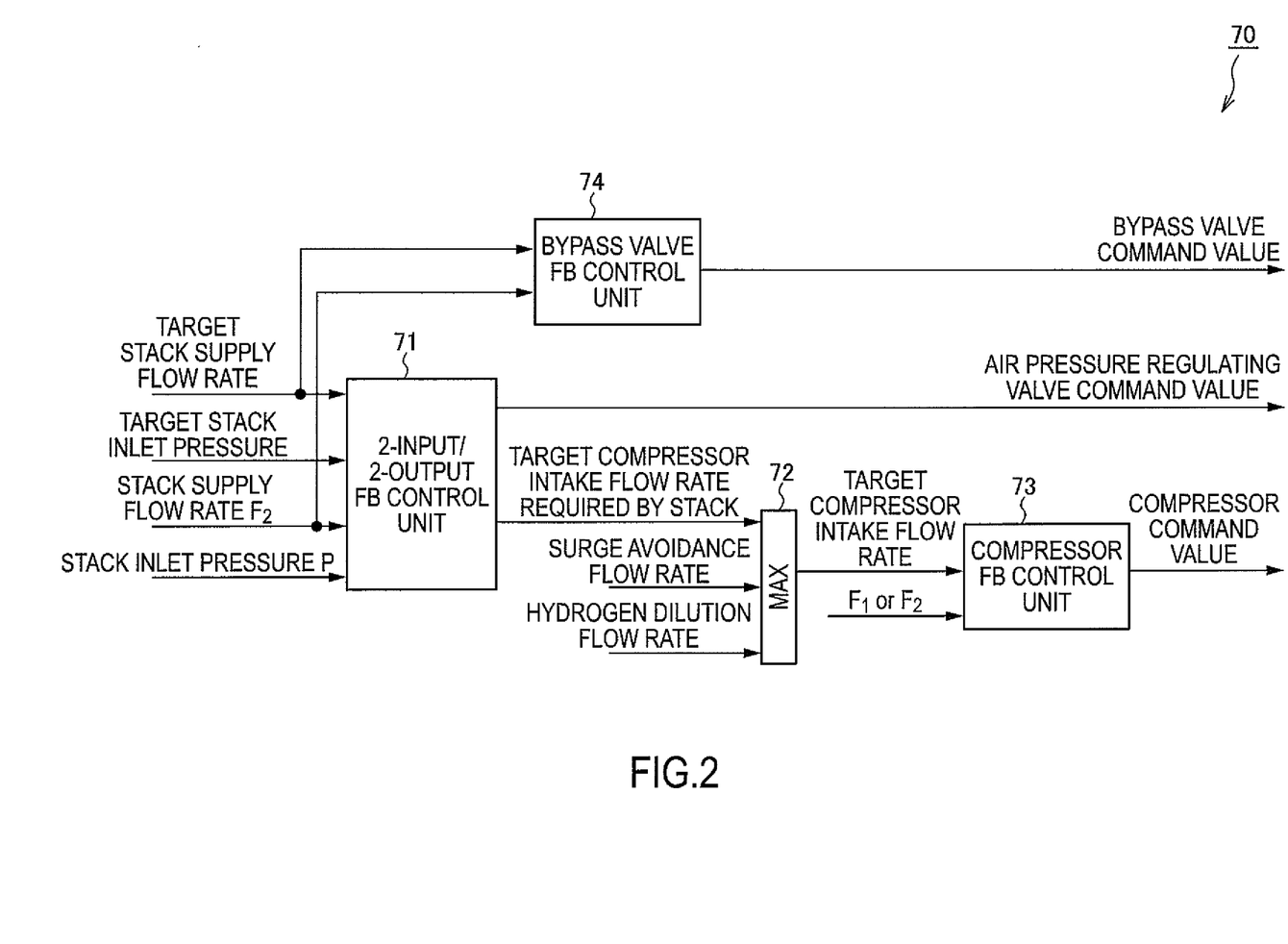
FIG. 2 is a block diagram illustrating a control unit of the fuel cell system according to a first embodiment of this invention.

FIG. 2 is a block diagram illustrating a control unit of the fuel cell system according to the first embodiment of this invention.

A control unit 70 of the fuel cell system according to this invention includes a two-input/two-output FB control unit 71, a maximum selection unit 72, a compressor FB control unit 73, and a bypass valve FB control unit 74.

The two-input/two-output FB control unit 71 determines two outputs (air pressure regulating valve command value and target compressor intake flow rate required by the stack) so that two inputs (stack supply flow rate F2 and stack inlet pressure P) converge to their respective target values (target stack supply flow rate and target stack inlet pressure). Specifically, calculation equations for modeling the system are set on the two-input/two-output FB control unit 71, and the two-input/two-output FB control unit 71 calculates the air pressure regulating valve command value and the target compressor intake flow rate required by the stack based on the calculation equations. It should be noted that the target compressor intake flow rate required by the stack corresponds to a "second flow rate required from the compressor" within the claims. Moreover, the target stack supply flow rate and the target stack inlet pressure are set based on a target output required from the fuel cell stack.

Figure 3A:
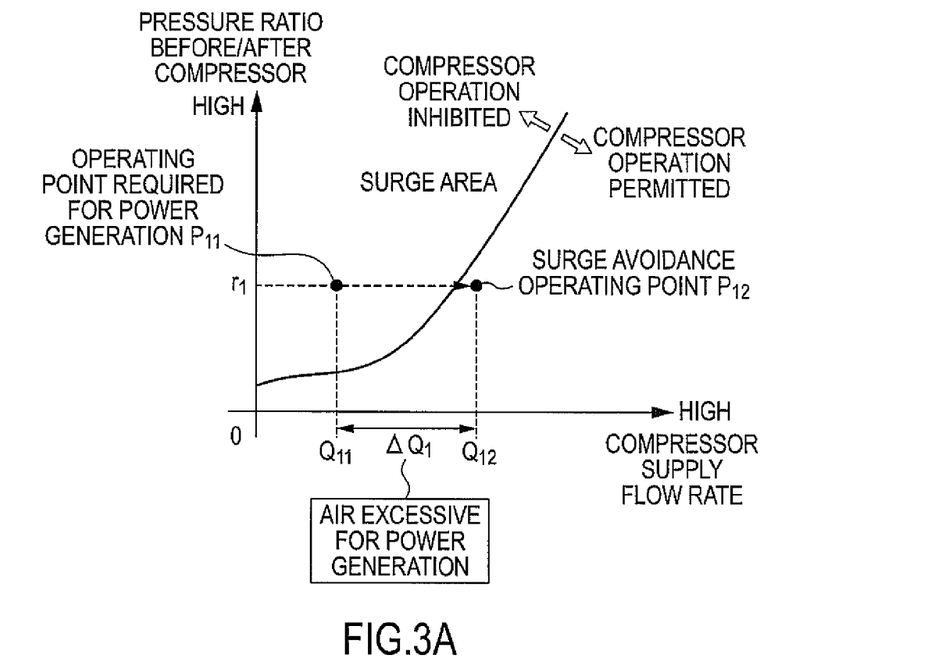
FIG. 3A is a chart illustrating a surge avoidance flow rate.
Figure 3B:
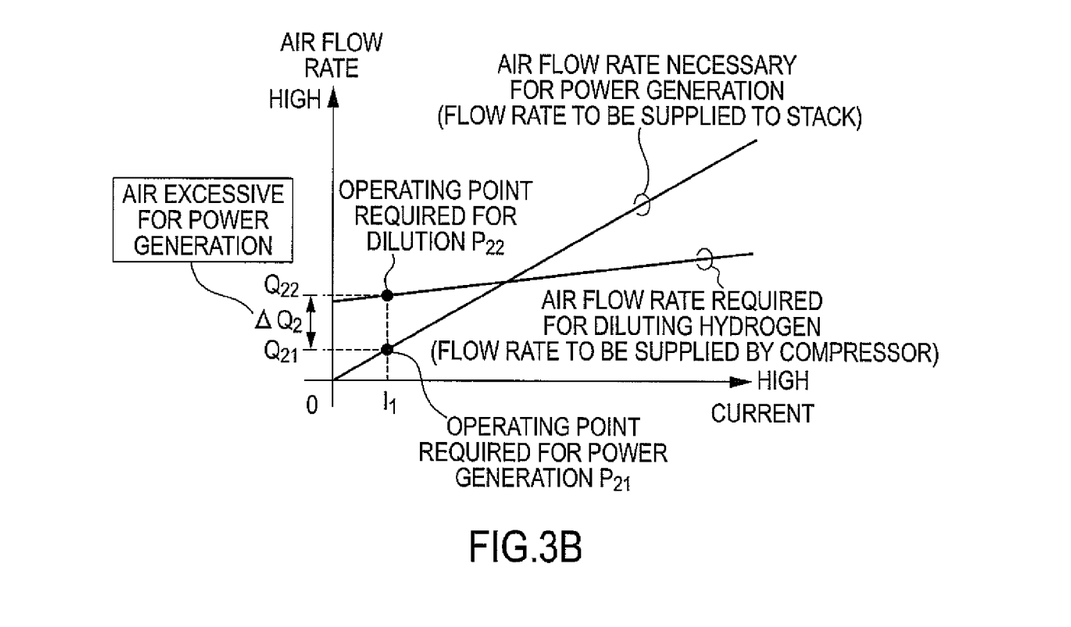
FIG. 3B is a chart illustrating a hydrogen dilution flow rate.

The maximum selection unit 72 selects the maximum value out of the target compressor intake flow rate required by the stack, a surge avoidance flow rate, and a hydrogen dilution flow rate, and sets the maximum value as a target compressor intake flow rate. Referring to FIGS. 3A and 3B, a description is given of the surge avoidance flow rate and the hydrogen dilution flow rate, and a reason for the configuration.

The cathode compressor 20 is a turbo compressor. The turbo compressor has a characteristic illustrated in FIG. 3A, and is inhibited from operating in an area (surge area) where a surge possibly occurs. For example, a case where an operating point set based on the target output required from the fuel cell stack is P11 (compressor supply flow rate Q11 and pressure ratio before/after compressor r1) is now considered. The operating point P11 exists in the surge area. If the compressor is operated at the operating point P11, the surge may occur. In this case, it is thus necessary to exit from the surge area by operating the compressor at an air flow rate Q12 more than the air flow rate Q11 set based on the target output required from the fuel cell stack. In other words, in this case, the air flow rate Q12 is a lower limit flow rate for operating the compressor, and the lower limit flow rate (compressor lower limit flow rate) is the surge avoidance flow rate. The compressor needs to be operated at a flow rate more than the compressor lower limit flow rate (surge avoidance flow rate).

Moreover, in the fuel cell system according to this invention, as described above, the waste gas (hydrogen-off gas) which has not been consumed for the power generation is diluted by the cathode gas, and is discharge to the atmosphere. The air flow rate required for the dilution is illustrated in FIG. 3B. When an output current required from the fuel cell stack is I1, an air flow rate (air flow rate to be supplied to the fuel cell stack) necessary for the power generation is Q21. In contrast, when the output current required from the fuel cell stack is I1, an air flow rate required for diluting the hydrogen is Q22. In this case, the compressor thus needs to be operated at the air flow rate Q22 more than the air flow rate Q21 required for the power generation. In others words, in this case, the air flow rate Q22 is a lower limit flow rate for operating the compressor, and the lower limit flow rate (compressor lower limit flow rate) is the hydrogen dilution flow rate. The compressor needs to be operated at a flow rate more than the compressor lower limit flow rate (hydrogen dilution flow rate).

For those reasons, the maximum selection unit 72 selects the maximum value out of the target compressor intake flow rate required by the stack, the surge avoidance flow rate, and the hydrogen dilution flow rate, and sets the maximum value as the target compressor intake flow rate.

It should be noted that $\Delta Q1$ ($=Q12-Q11$) is necessary for avoiding the surge, but is a surplus air flow rate for the power generation by the fuel cell stack. Moreover, $\Delta Q2$ ($=Q22-Q21$) is necessary for diluting the hydrogen, but is a surplus air flow rate for the power generation by the fuel cell stack. If the surplus air is supplied to the fuel cell stack, the operability of the fuel cell stack may be adversely affected. Thus, the surplus air is not supplied to the fuel cell stack, but is controlled to flow to the bypass flow passage 52.

FIG. 2 is now referred to again.

The compressor FB control unit 73 determines a compressor command value so that the flow rate (compressor intake flow rate F1 or stack supply flow rate F2) detected by the sensor converges to its target value (target compressor intake flow rate). Specifically, the compressor FB control unit 73 determines the compressor command value with feedback control (PI control) depending on a component proportional to a difference of the sensor rate from the target rate (target compressor intake flow rate) and a component (integral component) acquired by the time integration of the difference of the sensor rate from the target rate (target compressor intake flow rate). It should be noted that when the cathode flow rate supplied to the fuel cell stack is less than the compressor lower limit flow rate (in other words, the surplus air needs to be bypassed), the compressor FB control unit 73 determines the compressor command value so that the compressor intake flow rate F1 converges to its target rate (target compressor intake flow rate). Moreover, when the cathode flow rate supplied to the fuel cell stack is more than the compressor lower limit flow rate (in other words, the surplus air does not exist, and the bypassing is not necessary), the compressor FB control unit 73 determines the compressor command value so that the stack supply flow rate F2 converges to its target rate (target stack supply flow rate). It should be noted that in this case, the surplus air does not exist and the bypassing is not necessary, and the target stack supply flow rate is thus equal to the target compressor intake flow rate.

The bypass valve FB control unit 74 determines a bypass valve command value so that the stack supply flow rate F2 converges to its target rate (target stack supply flow rate). Specifically, the bypass valve FB control unit 74 determines the bypass valve command value with feedback control (PI control) depending on a component proportional to a difference of the stack supply flow rate F2 from the target rate (target stack supply flow rate) and a component (integral component) acquired by the time integration of the difference of the stack supply flow rate F2 from the target rate (target stack supply flow rate).

Figure 4:
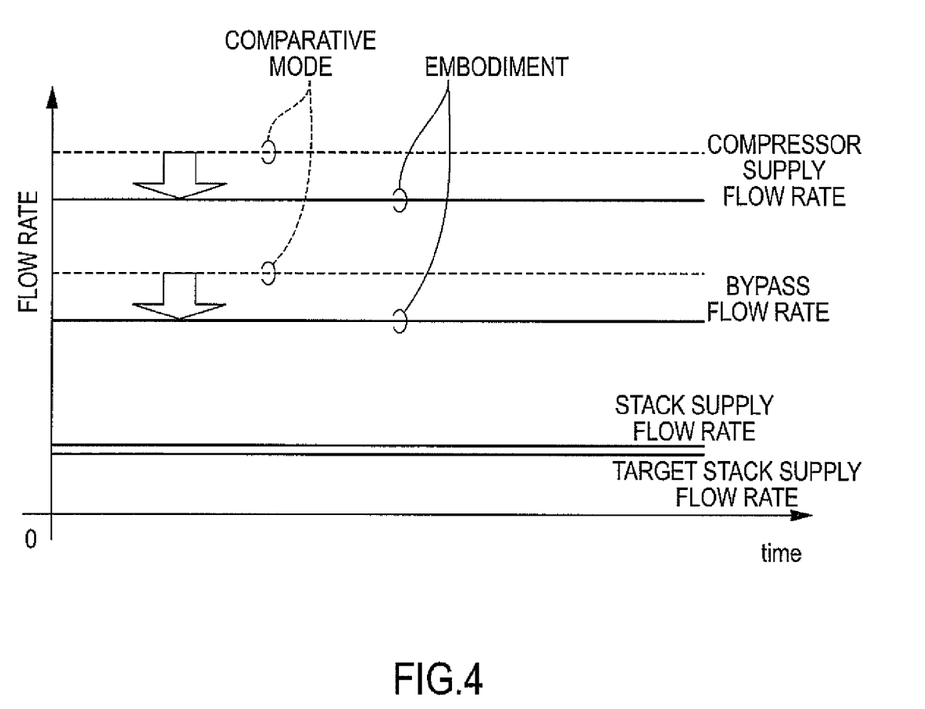
FIG. 4 is a chart illustrating effects of the first embodiment.

FIG. 4 is a chart illustrating effects of the first embodiment.

In a comparative mode (method disclosed in JP 2009-123550 A), as described above, a bypass flow rate increases depending on, for example, performance variations (individual variations) of a bypass valve and a compressor, and the supply flow rate of the compressor is increased so as to compensate for the variations as represented by the broken line of FIG. 4. Thus, the power consumption of the compressor increases.

In contrast, in the first embodiment, when the surplus air needs to be bypassed, the compressor FB control unit 73 determines the compressor command value so that the compressor intake flow rate F1 converges to its target rate (target compressor intake flow rate). Then, the bypass valve FB control unit 74 controls the bypass valve so that the stack supply flow rate F2 converges to the target rate (target stack supply flow rate). This configuration provides such an effect that the bypass valve and the compressor operate the stack supply flow rate. The supply flow rate of the compressor is prevented from increasing unnecessarily excessively, and the bypass valve is opened accordingly, which prevents the power consumption of the compressor from increasing uselessly.

Moreover, when the surplus air does not exist and the bypass is thus unnecessary, the compressor command value is determined so that the stack supply flow rate F2 converges to its target rate (target stack supply flow rate). In this way, even if a variation exists in the bypass valve, the stack supply flow rate can be controlled to reach the target rate. Further, in addition to an effect that the stack supply flow rate approaches the target rate, an effect that the supply flow rate from the compressor can keep the restriction imposed by the lower limit value is provided. Then, an excellent effect that even if the variation exists in the bypass valve, the fuel efficiency is improved without increasing the power consumption of the compressor is provided.

(Second Embodiment)

Figure 5:
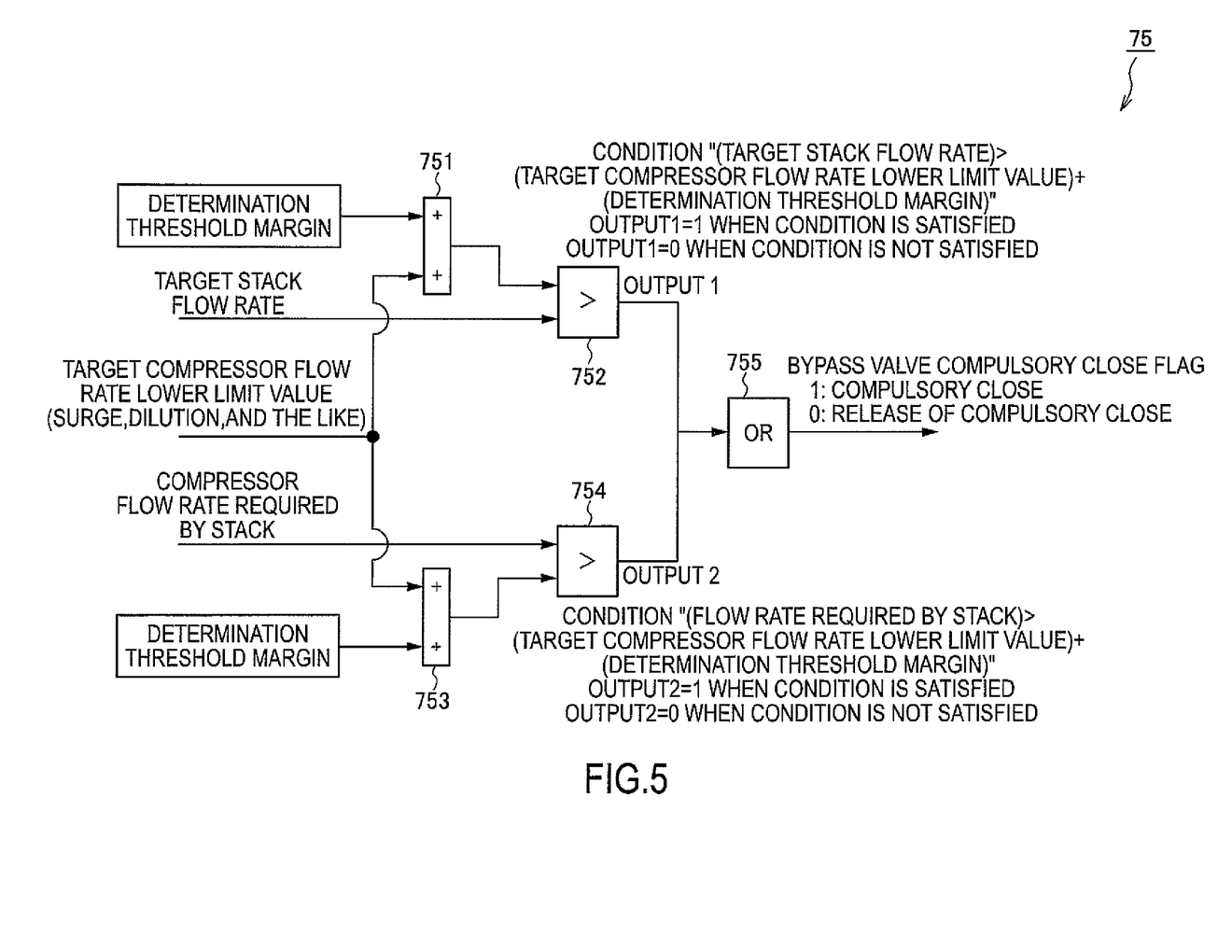
FIG. 5 is a block diagram illustrating a control unit of the fuel cell system according to a second embodiment of this invention.

FIG. 5 is a block diagram illustrating a control unit of the fuel cell system according to a second embodiment of this invention.

In this embodiment, the opening degree of the bypass valve is decreased when predetermined conditions are satisfied. Referring to the control block diagram of FIG. 5, a description is given of specific details thereof.

In this embodiment, the control unit includes a control block 75 for carrying out bypass valve compulsory close control in addition to the control blocks of the first embodiment.

The bypass valve compulsory close control block 75 includes an addition unit 751, a condition determination unit 752, an addition unit 753, a condition determination unit 754, and a compulsory close flag output unit 755.

The addition unit 751 outputs a value acquired by adding a margin to the compressor lower limit flow rate. The margin is not indispensable, and a magnitude of the margin only needs to be appropriately set depending on component specifications used for the system configuration, sensor errors, and control design results of parts for acquiring the compressor flow rate required by the stack.

The condition determination unit 752 determines whether the target stack flow rate is more than the value acquired by adding the margin to the compressor lower limit flow rate or not. The condition determination unit 752 outputs 1 as an output1 when the determination result is affirmative. The condition determination unit 752 outputs 0 as the output1 when the determination result is negative.

The addition unit 753 outputs a value acquired by adding a margin to the compressor lower limit flow rate. The margin is not indispensable, and a magnitude of the margin only needs to be appropriately set depending on component specifications used for the system configuration, sensor errors, and control design results of parts for acquiring the compressor flow rate required by the stack.

The condition determination unit 754 determines whether the compressor flow rate required by the stack is more than the value acquired by adding the margin to the compressor lower limit flow rate or not. The condition determination unit 754 outputs 1 as an output2 when the determination result is affirmative. The condition determination unit 754 outputs 0 as the output2 when the determination result is negative.

The compulsory close flag output unit 755 carries out such control as to compulsorily close the bypass valve when the output1 of the condition determination unit 752 is 1, or the output2 of the determination unit 754 is 1. The compulsory close flag output unit 755 releases the compulsory close control of the bypass valve when the output1 of the condition determination unit 752 is 0, and the output2 of the determination unit 754 is 0.

Figure 6:
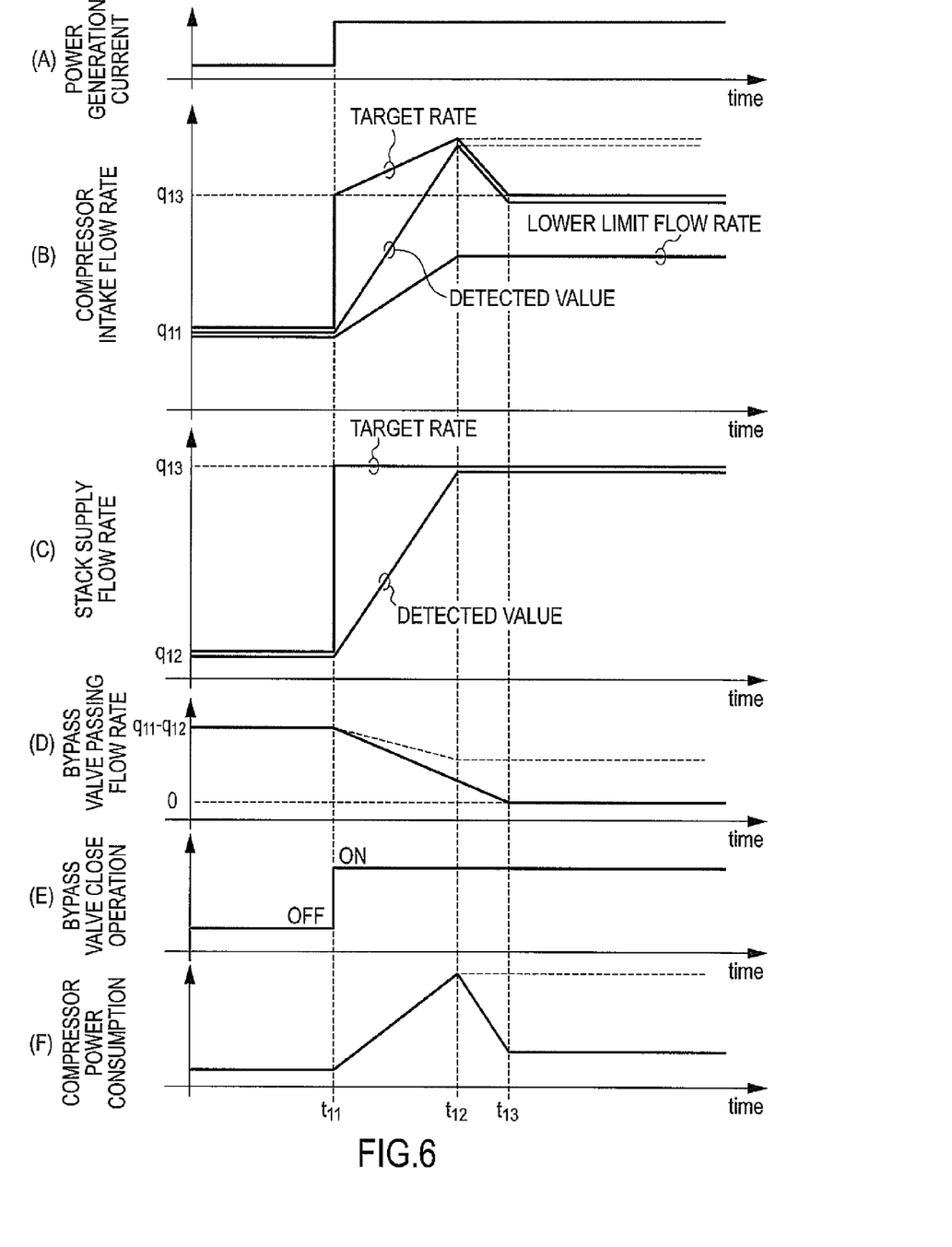
FIG. 6 is a timing chart illustrating effects of the second embodiment provided when a power generation current increases.

FIG. 6 is a timing chart illustrating effects of the second embodiment provided when a power generation current increases.

Referring to FIG. 6, a description is particularly given of a case where the condition determination unit 752 outputs 1 as the output1. Moreover, basically, the control illustrated in FIG. 2 is cyclically carried out. Moreover, in order to promote understanding of the figure, respective lines are shifted from each other so as not to overlap each other.

A power generation current required from the fuel cell stack is small before a time t11 (FIG. 6(A)), and an air flow rate q12 necessary for realizing the power generation current is thus small (FIG. 6(C)). Accordingly, the flow rate of the compressor may be small, but the compressor cannot be operated at a flow rate lower than the compressor lower limit flow rate. Then, the compressor is operated at a compressor lower limit flow rate q11 (FIG. 6(B)). Then, a flow rate q11-q12 surplus for the power generation is controlled to flow to the bypass flow passage (FIG. 6(D)).

The power generation current required from the fuel cell stack increases at the time t11 (FIG. 6(A)), and a target rate (target stack flow rate) of the air flow rate necessary for realizing the power generation current increases to q13 accordingly (FIG. 6(C)), and exceeds the compressor lower limit flow rate. As a result, the condition determination unit 752 outputs 1 as the output1, a compulsory close flag for the bypass valve is set to ON (FIG. 6(E)), and the bypass valve passage flow rate is decreased in a shorter period than that when the bypass valve close operation is not carried out.

Subsequently to the time t11, the compressor command value is generated by the FB control unit so that the stack supply flow rate follows the target rate. Therefore, when the difference between the stack supply flow rate and the target rate is large, the target compressor intake air flow rate is increased by the integration operation of the FB control unit as time elapses (FIG. 6(B)).

The stack supply flow rate reaches the target rate at a time t12. As a result, the bypass valve and a compressor manipulated variable do not change, and are brought into steady states.

On this occasion, if the bypass valve compulsory close control illustrated in FIG. 5 is not carried out, the bypass valve close operation is not carried out at the time t11, and the operation is thus slower than in the case where the bypass valve compulsory close control is carried out. Moreover, the stack supply flow rate matches the target value at the time t12, and the manipulated variable of the FB controller for the compressor flow rate thus stops changing (broken line of FIG. 6(B)). Then, the bypass flow rate also remains in a large state (broken line of FIG. 6(D)). In this state, the power consumption of the compressor is large (broken line of FIG. 6(F)). In other words, in this state, the supply flow rate of the compressor is increased unnecessarily excessively, resulting in an unnecessary increase in power consumption of the compressor.

In contrast, in this embodiment, the bypass valve compulsory close control is carried out to avoid the retention of the bypass valve flow rate, and the bypass flow rate decreases (solid line of FIG. 6(D)). As described above, basically, the control illustrated in FIG. 2 is cyclically carried out. Even when a state where the bypass flow rate is possibly retained occurs, the bypass valve compulsory close control is carried out, resulting in a decrease in bypass flow rate. The decrease affects the stack supply flow rate and the stack inlet pressure. When the control block diagram of FIG. 2 is cyclically carried out as a result, subsequently, the opening degree of the bypass valve decreases, resulting in a decrease in bypass flow rate. As a result, the compressor flow rate decreases as represented by the solid line of FIG. 6(B). Thus, the power consumption of the compressor decreases (solid line of FIG. 6(F)), a state where the power consumption is low continues after a time t13, and the power consumption of the compressor is prevented from unnecessarily increasing.

Figure 7A:
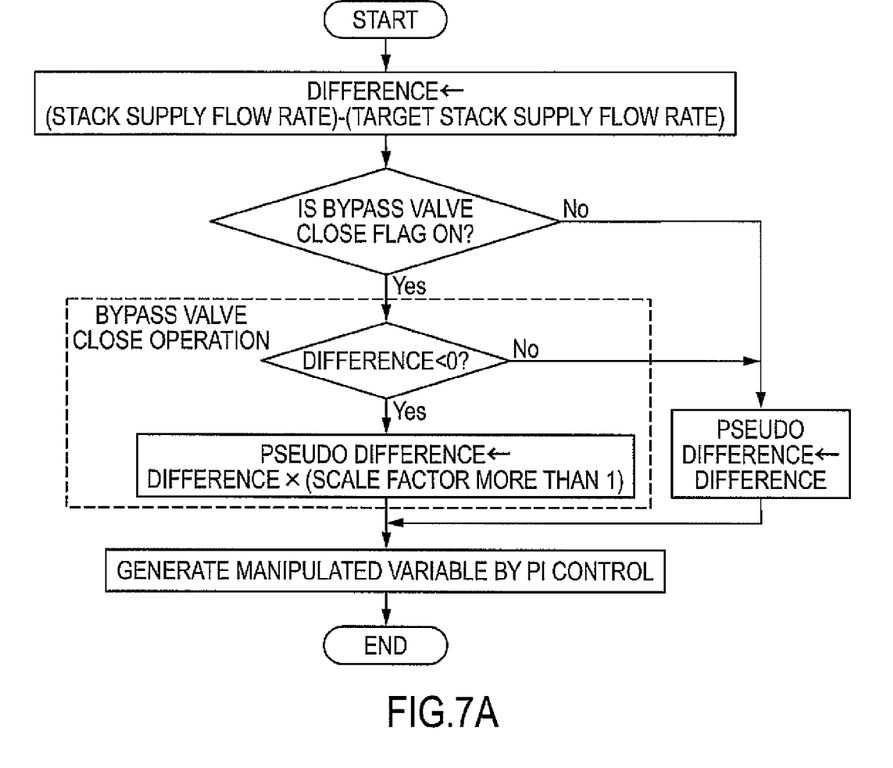
FIG. 7A is a control flowchart of a bypass valve close operation.
Figure 7B:
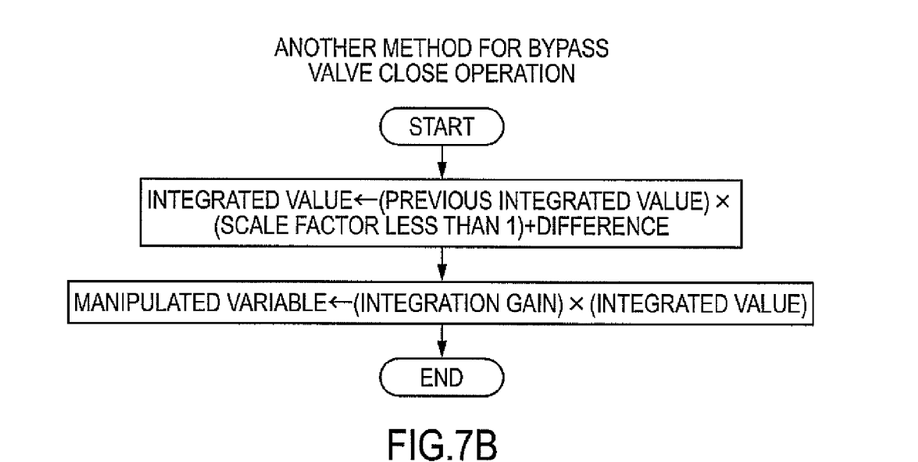
FIG. 7B is a control flowchart of the bypass valve close operation.

When a condition where a bypass valve manipulated variable is 0 corresponds to an operation of closing the bypass valve to decrease the bypass flow rate, the bypass valve close operation includes, for example, a method of multiplying a previous value of the integration operation of the FB controller for calculating the bypass valve manipulated variable by a scale factor less than one for forgetting when the compulsory close flag for the bypass valve is set to ON, and a method of increasing, at a predetermined rate, the difference acquired by subtracting the bypass valve passing flow rate out of the differences input to the FB controller, fixing the difference at a predetermined difference, or correcting the difference to a predetermined difference or less. Those methods are represented by flowcharts illustrated in FIGS. 7A and 7B.

Figure 8:
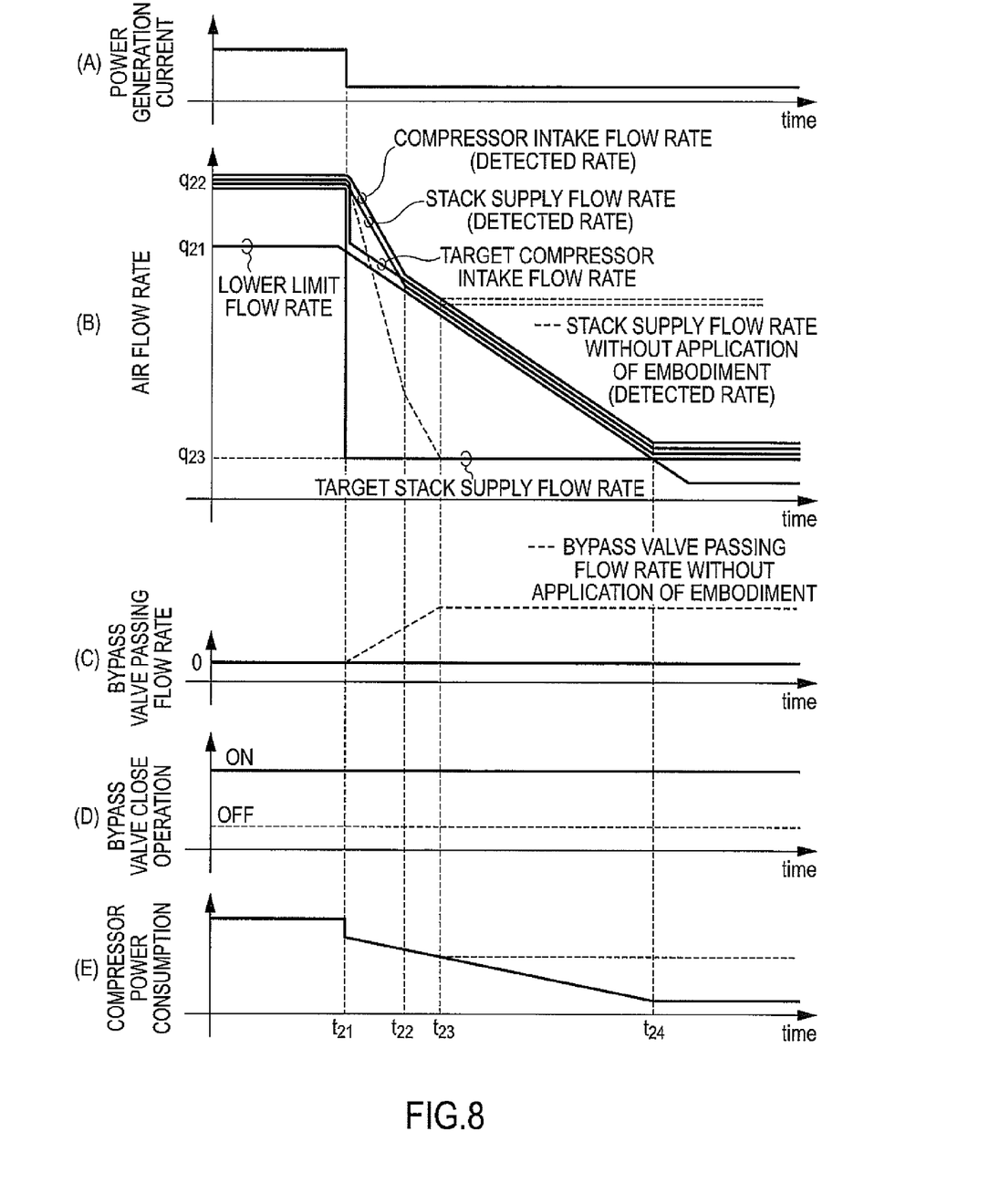
FIG. 8 is a timing chart illustrating effects of the second embodiment provided when the power generation current decreases.

FIG. 8 is a timing chart illustrating effects of the second embodiment provided when the power generation current decreases.

The power generation current required from the fuel cell stack is large before a time t21 (FIG. 8(A)), and an air flow rate q22 necessary for realizing the power generation current is thus large, and is more than a compressor lower limit flow rate q21 (FIG. 8(B)).

The power generation current required from the fuel cell stack decreases at the time t21 (FIG. 8(A)), and the target rate (target stack flow rate) of the air flow rate necessary for realizing the power generation current decreases to q23 accordingly, and decreases below the compressor lower limit flow rate (FIG. 8(B)). Accordingly, the flow rate of the compressor may be small, but the compressor cannot be operated at a flow rate lower than the compressor lower limit flow rate. Then, the compressor is operated at the compressor lower limit flow rate as the target compressor intake flow rate (FIG. 8(B)).

The compressor intake flow rate (detected value) matches the target compressor intake flow rate at a time t22. The cathode gas does not need to be bypassed, and the bypass flow rate is thus zero (FIG. 8(C)). Accordingly, the stack supply flow rate (detected value) matches the compressor intake flow rate (detected value).

After the stack supply flow rate reaches the target rate, when the control block illustrated in FIG. 2 is cyclically carried out without the bypass valve compulsory close control illustrated in FIG. 5, the target compressor intake flow rate is maintained at a constant level as represented by the broken line after a time t23. As a result, a surplus flow rate, which is originally unnecessary for supply to the stack, may be bypassed. In this state, the power consumption of the compressor is large (broken line of FIG. 8(E)). In other words, in this state, the supply flow rate of the compressor is increased unnecessarily excessively, resulting in an unnecessary increase in power consumption of the compressor.

In contrast, in this embodiment, the bypass valve compulsory close control is carried out, thereby always maintaining the bypass flow rate to zero. As a result, the target compressor intake flow rate decreases so that the stack supply flow rate reaches the target rate as illustrated in FIG. 8(B). Thus, the power consumption of the compressor decreases (solid line of FIG. 8(E)).

Even after the stack supply flow rate reaches the target rate at a time t24, the power consumption of the compressor is low, and the power consumption of the compressor is thus prevented from unnecessarily increasing.

Though a description has been given of the embodiments of this invention, the above-mentioned embodiments describe only some of the application examples of this invention, and the description is not intended to limit the technical scope of this invention to the specific configurations of the above-mentioned embodiments.

For example, one of the above-mentioned embodiments may be combined with another of the above-mentioned embodiments as appropriate.

The invention claimed is:

1. A fuel cell system, comprising:
 a fuel cell stack;
 a cathode compressor configured to supply a cathode gas;
 a cathode flow passage connected to the fuel cell stack, for the cathode gas to flow;
 a bypass flow passage branching from the cathode flow passage upstream of the fuel cell stack, thereby bypassing the fuel cell stack;

a bypass valve provided on the bypass flow passage, and configured to adjust a cathode flow rate flowing through the bypass flow passage;

a stack flow rate sensor configured to detect a cathode flow rate supplied to the fuel cell stack;

a compressor flow rate sensor configured to detect a cathode flow rate taken into the cathode compressor; and a controller configured to:
calculate a flow rate necessary for the fuel cell stack depending on a state of a fuel cell;
calculate a flow rate which required from the cathode compressor depending on a requirement different from the requirement by the fuel cell stack; and
select a first cathode flow rate control when the flow rate required from the cathode compressor is more than the flow rate required by the fuel cell stack, the first cathode flow rate control being performed so as to control the cathode compressor based on the flow rate required from the cathode compressor and a compressor flow rate detected by the compressor flow rate sensor, and control the bypass valve based on the flow rate required by the fuel cell stack and a stack flow rate detected by the stack flow rate sensor, and
select a second cathode flow rate control when the flow rate required by the fuel cell stack is more than the flow rate required from the cathode compressor, the second cathode flow rate control being performed so as to control the cathode compressor based on the flow rate required by the fuel cell stack and the stack flow rate detected by the stack flow rate sensor.

2. The fuel cell system according to claim 1, wherein when the flow rate required by the fuel cell stack becomes more than the flow rate required from the cathode compressor, the controller is configured to compulsorily apply valve close control to the bypass valve.

3. The fuel cell system according to claim 2, wherein:
the controller is configured to calculate a second flow rate required from the cathode compressor based on a difference between an air flow rate required by the fuel cell stack based on the state of the fuel cell and an actual stack flow rate; and
the controller is configured to control the cathode compressor by using a larger one of the flow rate required from the cathode compressor and the second flow rate required from the cathode compressor.

4. The fuel cell system according to claim 1, wherein:
the controller is configured to calculate a second flow rate required from the cathode compressor based on a difference between an air flow rate required by the fuel cell stack based on the state of the fuel cell and an actual stack flow rate; and
the controller is configured to control the cathode compressor by using a larger one of the flow rate required from the cathode compressor and the second flow rate required from the cathode compressor.

5. The fuel cell system according to claim 3, wherein calculating the second flow rate required from the cathode compressor is further based on a first lower limit flow rate for the cathode compressor that is a surge avoidance flow rate and a second lower limit flow rate for the cathode compressor that is a dilution flow rate for diluting gas not consumed by the fuel cell stack.

* * * * *